(12) United States Patent
Rieger et al.

(10) Patent No.: US 7,355,389 B2
(45) Date of Patent: Apr. 8, 2008

(54) METHOD AND SYSTEM FOR LINEAR POSITIONING

(75) Inventors: Ryan W. Rieger, Brooklyn Center, MN (US); Hong Wan, Plymouth, MN (US); Michael L. Freeman, Woodbury, MN (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/265,409

(22) Filed: Nov. 1, 2005

(65) Prior Publication Data

US 2007/0096723 A1    May 3, 2007

(51) Int. Cl.
*G01B 7/14*    (2006.01)
*G01B 7/30*    (2006.01)

(52) U.S. Cl. .............................. 324/207.24; 324/207.21
(58) Field of Classification Search ........... 324/207.24, 324/207.21
See application file for complete search history.

(56) References Cited

U.S. PATENT DOCUMENTS 6,255,811 B1 * 7/2001 Hatazawa et al. ..... 324/207.21
6,448,760 B1 * 9/2002 Neumann et al. ........ 324/207.2
6,731,108 B2 * 5/2004 Zalunardo et al. ....... 324/207.2

FOREIGN PATENT DOCUMENTS

WO    WO2005029004    * 3/2005

OTHER PUBLICATIONS

"Applications of Magnetic Position Sensors", Honeywell Solid State Electronics Center, Application Note AN211, pp. 1-8 (Mar. 2002).
"Magnetic Sensor Products", Honeywell Solid State Electronics Center, HMC/HMR Series, pp. 1-4 (Mar. 2002).
"Linear/Angular/Rotary Displacement Sensors HMC1501/HMC1512", Honeywell Solid State Electronics Center, pp. 1-4 (Mar. 2002).
Bratland et al., "Linear Position Sensing Using Magnetoresistive Sensors", Honeywell Solid State Electronics Center, A2.4, pp. 1-6 (Mar. 2002).

* cited by examiner

*Primary Examiner*—Reena Aurora
(74) *Attorney, Agent, or Firm*—Black Lowe & Graham PLLC (57) ABSTRACT

Systems and methods for determining linear position are disclosed. An example system includes a magnet with first and second magnetic poles. The first and second magnetic poles define an axis of the magnet. The system also includes a magnetoresistive sensor comprising a magnetoresistive sensor structure. The magnetoresistive sensor structure defines a plane that, in the system, is oriented out-of-plane with the axis of the magnet. In operation, the magnet travels, with respect to the magnetoresistive sensor, along a substantially linear path of travel that is substantially parallel to the plane defined by the sensor structure, such that the sensor operates in a saturation mode when the magnet is located along a given portion of the path of travel. When operating in the saturation mode, the magnetoresistive sensor produces an electrical signal that corresponds with a linear position of the magnet along the given portion of the path of travel.

14 Claims, 4 Drawing Sheets

METHOD AND SYSTEM FOR LINEAR POSITIONING

GOVERNMENT RIGHTS

The United States Government has acquired certain rights in this invention pursuant to Contract No. NCC-1-393 awarded by the National Aeronautics and Space Administration.

BACKGROUND

I. Field

The present disclosure relates to systems and methods for linear positioning.

II. Description of Related Art

Position sensing is widely used in a number of industrial and commercial applications, such as automotive, aviation and manufacturing. For instance, linear position sensing systems may be used in manufacturing applications for determining the relative positions of different components of manufacturing equipment. As one example, a linear positioning system could be used to determine the position of a drill bit chuck assembly relative to a fixed position on a drill press in order to control the depth of a bore in a material, such as in an application using robotic equipment. As another example, linear positioning systems may be implemented as part of cruise control systems for passenger vehicles. In such applications, a linear position sensing system may be used to determine and control throttle position when the vehicle is operating with a cruise control system activated. There are, of course, countless other applications in which position sensing systems may be employed.

Traditionally, positioning sensing systems have been contact based. In such contact-based systems, certain components of the positioning system are placed in physical contact (e.g., a metal contact, brush or the like contacting a track or groove) where a linear position is determined based on the physical point of contact between the components. However, because the components of such a system move with respect to each other, such approaches are prone to failure due to a number of factors.

For instance, debris, such as dirt, dust or other matter, may collect in a track or groove (e.g., along which a contact may travel), thus preventing an accurate determination of position due to such debris interfering with physical contact between components. Also, such contact-based systems are further prone to reliability problems due to physical wear of the components at the point (or points) of contact that results from the movement of the parts relative to one another. For instance, as those components experience physical wear, that wear will eventually result in the components no longer making physical contact at one or more points along a corresponding path of travel. This loss of contact results in such a positioning system not working as expected due to loss of signal (e.g., signal drops).

One approach that is becoming more prevalent for position sensing applications that overcomes at least some of the concerns discussed above is the use of Anisotropic Magneto-Resistive (AMR) sensors. Such solutions are non-contacting and, therefore, do not experience the reliability and wear-out concerns (due to physical contact of components) of contact-based position sensing systems discussed above. In such an approach, such as for a linear positioning system, a magnet or sensor element is affixed to a linearly moving object (such as a shaft in a piece of manufacturing equipment) and a complementary sensor or magnet is mounted in a fixed position in physical proximity to the linearly moving object.

Using such an AMR sensor, the relative direction (e.g., angle) of the resulting magnetic field from the magnet can be quantified electronically by the sensor based on a differential voltage produced by the sensor. A linear position of the magnet relative to the sensor (a linear position) may be determined based on this electrical signal, which may display a $\cos^2 \theta$ relationship, where $\theta$ is the angle of incidence of the magnetic field through the sensor. The principles of such approaches are described in Honeywell Application Note AN221, entitled "Applications of Magnetic Position Sensors", which was publicly available on the Internet as of Mar. 28, 2002. Honeywell Application Note 211 (AN211) is incorporated by reference herein in its entirety.

One drawback of current approaches for linear position sensing using AMR sensors is that only a relatively small portion of the electrical signal produced by the AMR sensor is usable for position determination (e.g., approximately 50% of a "linear region" of the electrical signal when multiple sensors are used in an array). This limitation is due, in part, to the fact that such electrical signals include three "mid-point crossings" for each pass of the magnet along a given portion of a path of travel where the sensor is magnetically saturated relative to the sensor. It will be appreciated by those working in this area that the AMR sensor operating in magnetic saturation is desirable for accurate position determination.

This drawback (using only 50% of the linear region of the produced electrical signal) translates to higher cost and increased system complexity in linear positioning systems where it is desirable to determine a linear position of an object over longer distances at a given resolution. For instance, in systems where it is desirable to determine position over a linear distance that is greater than a distance corresponding with the usable portion of the electrical signal for an AMR sensor, multiple position sensors are used. The multiple sensors are arranged linearly along a path that is parallel with the path of travel with the sensor to sensor spacing being determined by the length of the section of the path of travel that corresponds with the usable portion of the electrical signal for a single sensor. It will be appreciated that in such arrangements, the sensor density is higher than would be possible if more of the linear region of the electrical signal for each sensor was usable of position determination.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are given by way of example and meant to be illustrative, not limiting in scope. In various embodiments, one or more of the above-described problems have been reduced or eliminated, while other embodiments are directed to other improvements.

An example system for determining linear position includes a magnet, where the magnet has a first magnetic pole and a second magnetic pole. The first magnetic pole and the second magnetic pole define an axis of the magnet. The example system further includes a magnetoresistive sensor comprising a magnetoresistive sensor structure. The magnetoresistive sensor structure defines a plane that, in the system, is oriented substantially perpendicular to the axis of the magnet.

In operation, the magnet travels, with respect to the magnetoresistive sensor, along a substantially linear path of travel, the path of travel being substantially parallel to the plane defined by the sensor structure. The sensor operates in a saturation mode when the magnet provides a magnetic field at the sensor location exceeding a minimum threshold field. Therefore, for a given magnet, only a certain portion of the path of travel satisfies the condition. Further, when operating in the saturation mode, the magnetoresistive sensor produces an electrical signal that corresponds with a linear position of the magnet along the given portion of the path of travel. The linear position may be determined using signal conditioning circuitry, where the signal conditioning circuitry analyzes and/or processes the electrical signal to determine the position. In one approach, the signal conditioning circuitry performs successive analog to digital conversions of the electrical signal to determine linear position at a given point in time.

An example method for detecting linear position includes providing a magnet having a first magnetic pole and a second magnetic pole, where the first magnetic pole and the second magnetic pole define an axis of the magnet. The method further includes providing a magnetoresistive sensor comprising a magnetoresistive sensor structure. The magnetoresistive sensor structure defines a plane that is oriented substantially perpendicular to the axis of the magnet. The method also includes receiving an electrical signal produced by the magnetoresistive sensor, where the electrical signal corresponds with a linear position of the magnet along a given portion of a path of travel, where the path of travel is substantially parallel with the plane. In the example method, the magnetoresistive sensor operates in a saturation mode when the magnet is located along the given portion of the path of travel.

BRIEF DESCRIPTION OF THE DRAWINGS

Example embodiments are illustrated in referenced figures of the drawings. It is intended that the embodiments and figures disclosed herein are to be considered illustrative rather than restrictive.

DETAILED DESCRIPTION

I. AMR Sensor Overview

Figure 1:
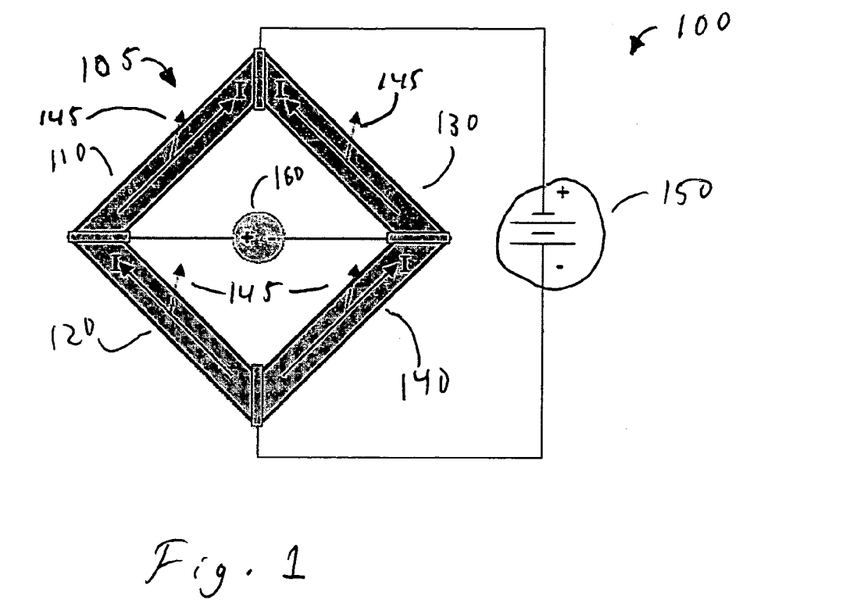
FIG. 1 is a drawing of an anisotropic magnetoresistive (AMR) sensor.

An example AMR sensor 100 is illustrated in FIG. 1. The sensor 100 includes a magnetoresistive sensor structure 105 in the form of a Wheatstone bridge circuit. The sensor structure 105 is a substantially two-dimensional structure that defines a plane, which may be termed a sensor plane. The sensor structure 105 includes a plurality of magnetoresistive elements 110, 120, 130, 140 that form a diamond shape pattern. The magnetoresistive elements 110, 120, 130, 140 are generally formed of ferrous materials with anisotropic magnetoresistive properties. Such elements change resistance as a result of a magnetic field being applied. The relationship of the resistance of the elements 110, 120, 130, 140 has a $\cos^2 \theta$ relationship with a saturation magnetic field where $\theta$ is the angle between a magnetic moment vector 145 and a respective current I flowing in each of the elements 110, 120, 130, 14 of the sensor structure 105.

The top and bottom connections of the sensor structure 105 are given a direct current (DC) stimulus using a DC voltage supply 150. A differential voltage 160 is measured across the side connections of the sensor structure 105 as an indication of the direction of the applied magnetic field. With no magnetic field applied (e.g., 0 gauss), this differential voltage is essentially zero, except for a small offset voltage due to manufacturing tolerances of the elements 110, 120, 130 and 140. Such an offset may be measured and taken into account by signal conditioning circuitry implemented in conjunction with the sensor 100.

In order to accurately determine the relative direction of an externally applied magnetic field using the magnetoresistive sensor 100, the magnetization direction of the elements 110, 120, 130, 140 must be substantially aligned with the applied magnetic field. Such a condition may be termed "saturation" or "magnetic saturation." During saturation, the externally applied magnetic field substantially completely re-orients the magnetization of the elements 110, 120, 130, 140.

The strength of the magnetic field that is applied to achieve such saturation will vary depending on the material used to form the elements 110, 120, 130, 140. For instance, such elements that are formed of a nickel-iron alloy (referred to as Permalloy) in AMR sensors available from Honeywell International, Inc. saturate in the presence of a magnetic field of approximately 40 to 50 gauss. While applying a magnetic field with a lower magnetic flux than is needed to saturate a particular sensor structure 105 may result in some Wheatstone bridge operation (e.g. some differential voltage), such operation (e.g., when unsaturated) may not provide an accurate indication of the relative direction of the applied magnetic field due to less than substantially complete re-orientation of the magnetization of the elements. Therefore, the sensor 100 in such a situation would provide an inaccurate indication of linear position.

To determine linear position using the AMR sensor 100 shown in FIG. 1, the electrical signal (e.g., the differential voltage 160) produced by the AMR sensor 100 is communicated to signal conditioning circuitry (not shown). An example of such signal conditioning circuitry and its operation is described in Honeywell Application Note AN211, which was cited above and is incorporated herein by reference in its entirety. For purposes of brevity and clarity, the operation of such signal conditioning circuitry is not described in detail here. Briefly, however, the signal conditioning circuitry may process and/or analyze the electrical signal produced by the AMR sensor structure 105 and determine the position of a magnet (e.g., with a field of sufficient strength) that is within range of the sensor 100. This may be done, for example, by performing an analog to digital conversion on the electrical signal. Once the conversion is done, the digital value may be compared with a look-up table to determine the position of the magnet that corresponds with the electrical signal (e.g., the differential voltage) received by the signal conditioning circuitry.

Figure 2:
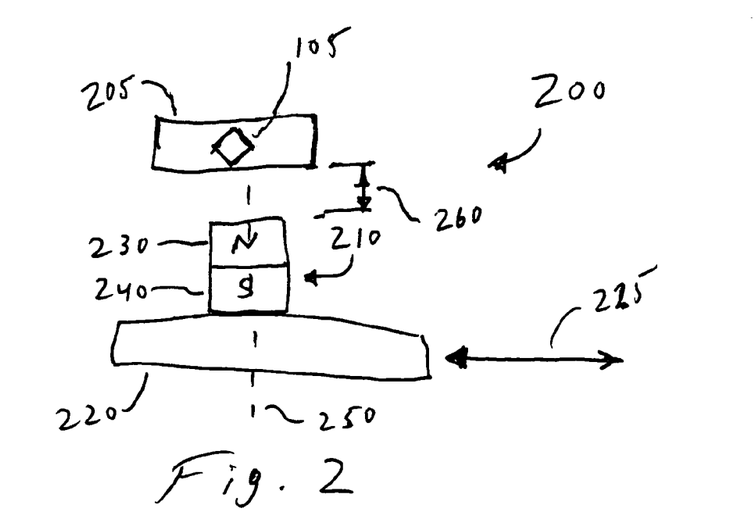
FIG. 2 is a diagram of a current linear positioning system.

Referring now to FIG. 2, a linear positioning system 200 is illustrated. The system 200 includes an AMR sensor 205, which contains a sensor structure 105, as was illustrated and discussed with respect to FIG. 1. In the system 200 shown in FIG. 2, it will be appreciated that the AMR sensor 205 is coupled with a DC voltage source, as shown for the sensor 100 in FIG. 1, and may be further coupled with signal conditioning circuitry (or other circuitry), as has been previously described.

The system 200 further includes a magnet 210 that is coupled with a shaft 220. In the system 200, the shaft 220 travels (in either direction) along a path 225, which causes the magnet 210 to move relative to the sensor 205. The magnet 210 includes a north pole 230 and a south pole 240, which define an axis 250 of the magnet 210. As shown in FIG. 2, a top surface of the north pole 230 of the magnet 210 is a distance 260 away from the sensor 205. In the system 200, the distance 260 is substantially fixed. It will be appreciated that the distance 260 is factored into the determination of the position of the magnet 210 with respect to the sensor 205, such as by using signal conditioning circuitry implemented with a microcontroller. As is also shown in FIG. 2, the axis of the magnet 210 is oriented in parallel with a sensor plane (such as discussed above) that is defined by the AMR sensor structure 105 in FIG. 2.

As the shaft 220 carrying the magnet 210 travels from left to right past the sensor 205 of FIG. 2 (starting and ending outside the range where the sensor 205 is saturated by the field of the magnet), an electrical signal is produced. A graph 300 illustrating an electrical 310 produced by the sensor 205 in such a situation is illustrated in FIG. 3.

In the graph 300, the x-axis represents a mid-point 320 for the signal 310. As shown in FIG. 3, the signal 310 that is produced as the magnet 210 travels from left to right along the travel path 225 (where the magnet starts and ends its travel outside the range of the sensor) crosses the mid-point 320 at three places. The electrical signal 310 takes this form due to the "in-plane" orientation of the magnetic fields produced by the magnet 210 with the elements of the AMR sensor structure 105.

Figure 3:
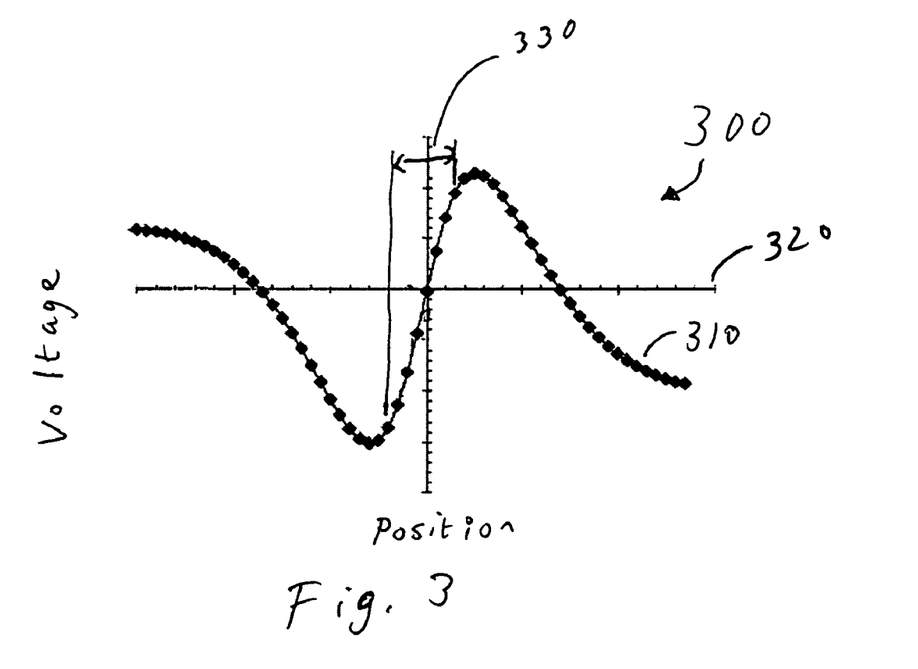
FIG. 3 is a graph illustrating an electrical signal produce using the linear positioning system of FIG. 2.

A linear range 330 of the signal 310 is also shown in FIG. 3. Due to the fact that the signal 310 includes three mid-point 320 crossings limits the range portion of the linear region 330 to about 50% of the linear region when multiple sensors are used an array, as was indicated above. As discussed above, this limitation results in a higher density of sensors being used in systems where linear position is to be determined over a distance that is longer than the distance of a region corresponding with the useable range (e.g., ~50% of the linear range 330) of the sensor 205 of FIG. 2. Further in such applications, due to the higher sensor density, the limitation on the usable portion of the linear region 300 also results in increased system complexity in the form of additional circuitry, high manufacturing costs, etc.

II. AMR Sensor with "Out-of-plane" Orientation

Figure 4:
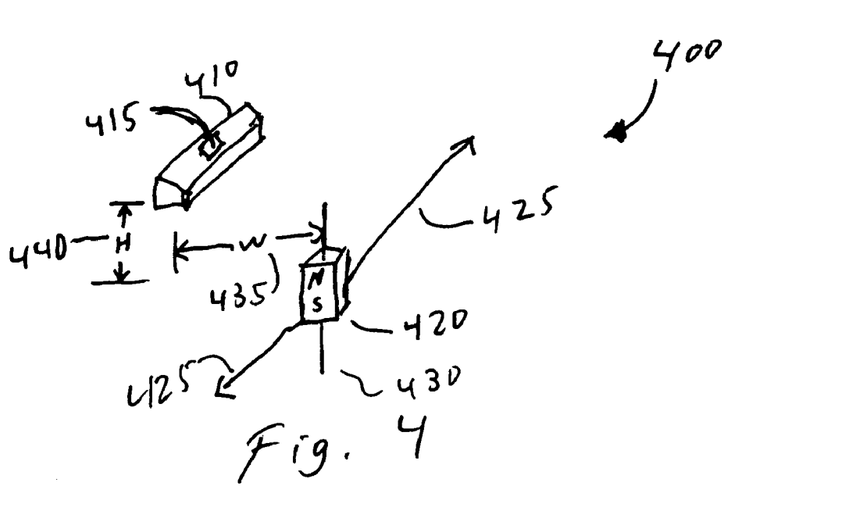
FIG. 4 is a schematic diagram of an improved linear positioning system.

Referring now to FIG. 4, a system 400 for determining linear position using an "out-of-plane" configuration between the axis 430 of a magnet 420 and a plane defined by a magnetoresistive sensor structure 415 is shown. The system 400 includes an AMR sensor 410, which may be of substantially the same construction as the AMR sensor 100 described above with reference to FIG. 1. The AMR sensor 410 includes the sensor structure 415. As was previously described for the sensor structure 105, the sensor structure 415 defines a plane. As is illustrated in FIG. 4, the plane defined by the sensor structure 415 is oriented substantially perpendicular to the axis 430 of the magnet 420. The magnet 420, as indicated in FIG. 4, has a north pole and a south pole, which define the axis 430 in like fashion as has been previously described.

While embodiments of linear positioning systems are generally described herein as being implemented such that a plane defined by one or more sensor structures (such as the plane defined by the sensor structure 415) are substantially perpendicular the axis of a magnet (such as the axis 430 of the magnet 420), it will be appreciated that other out-of-plane configurations are possible. For instance, for the system 400, the plane defined by the sensor structure 415 could be oriented at an angle of 45 degrees with the axis 430 of the magnet 420. The particular arrangement and relative orientation of the sensor structure(s) and the magnet in a given linear positioning system will depend, in part, on the particular application of the system.

It will also be appreciated that for the system 400, as well as for other embodiments described herein, the orientation of the poles of the magnet 420 may be reversed, such that the south pole of the magnet 420 is positioned closer to the AMR sensor 410 than the north pole of the magnet 420. Such an arrangement would, of course, affect the electrical signal produced by the sensor 410 (e.g. the signal may be inverted), and such effects would need to be accounted for when determining position based on such an electrical signal.

As shown in FIG. 4, the magnet 420, which may be attached to a shaft or other object, travels, with respect to the AMR sensor 410, along a path of travel 425. The path of travel 425 is substantially linear and substantially parallel to the plane defined by the sensor structure 415. For the system 400, the path of travel 425, is arranged along a line that is a first distance 'W' from an approximate center of the magnetoresistive sensor structure in a first Cartesian coordinate axis and a second distance 'H' from the first Cartesian coordinate axis in a second Cartesian coordinate axis. As shown in FIG. 4, the first distance W is measured in the plane defined by the magnetoresistive sensor structure and the second distance H is measured along a line that is orthogonal to the plane defined by the sensor structure 415.

For the system 400, as was indicated above, the magnet 420 moves with respect to the sensor 410. In such an embodiment, the sensor 410 may remain in a fixed position. In an alternative embodiment the magnet 420 may be fixed in its position while the sensor 410 moves along a path of travel relative to the magnet 420.

In the system 400, the sensor 410 will operate in magnetic saturation (saturation mode) when the magnet 420 is located along a given portion of the path of travel 425, which may be referred to as the portion of the path of travel 425 where the magnet 420 is within the sensor 410's range. When operating in saturation (or saturation mode), the magnetoresistive sensor 410 produces an electrical signal that corresponds with a linear position of the magnet along the given portion of the path of travel. For the system 400, because of the orientation of the magnetic flux of the magnet 420 with the elements of the sensor structure 415, the electrical signal produced by the sensor 410 as the magnet 420 travels along the given portion of the path of travel 425 in a single direction approximates a third order polynomial that includes only a single mid-point crossing (as is illustrated for a three sensor configuration in FIG. 6).

Because the electrical signal produced using the linear positioning system 400 includes only a single mid-point crossing, nearly the entire linear range of such a signal may be used for linear position determination as compared to the electrical signal 310 shown in FIG. 3, where only approximately 50% of the linear range was usable due to three mid-point crossings. This allows for the sensor 410 to be used to determine position over a greater distance than the sensor 205 in FIG. 2 (approximately 1.8 times the distance). Therefore, using an arrangement such as the one illustrated in FIG. 4 allows for increasing the sensor to sensor spacing (e.g., decreasing sensor density) in positioning systems where a linear position is to be determined over longer distances, as has been previously described. Further, such a decrease in sensor density also would allow for implementing less complex positioning systems and a reduction in the cost of such systems due to the need for fewer components (e.g., sensors, multiplexers and other devices). Such a multiple sensor system is illustrated in FIG. 5.

III. Three Sensor "Out-of-plane" Linear Positioning System

Figure 5:
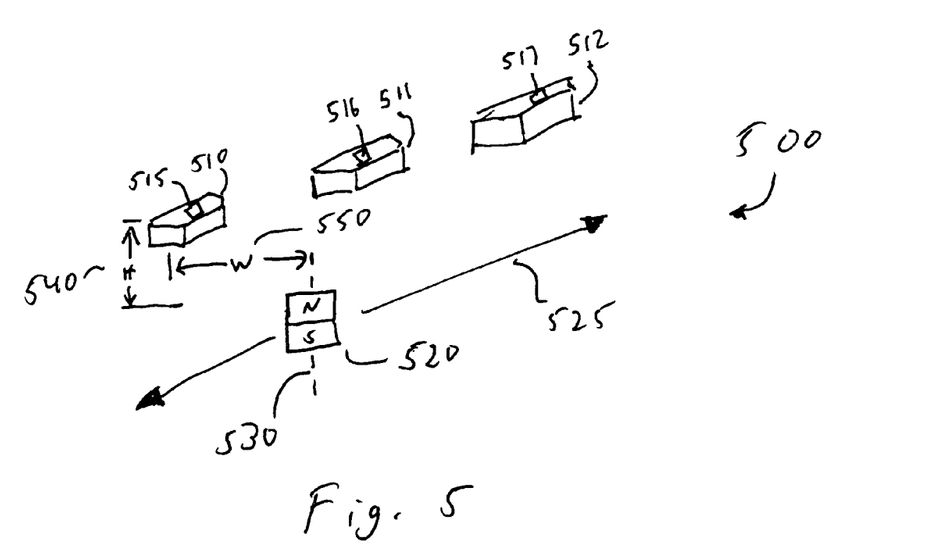
FIG. 5 is a diagram of a three sensor linear positioning system using the sensor arrangement shown in FIG. 4.

FIG. 5 illustrates a three sensor linear positioning system 500 that includes three AMR sensors 510, 511, 512, where each sensor includes a corresponding sensor structure 515, 516, 517. As with the sensors described above with respect to FIGS. 2 and 4, the sensor structures 515, 516, 517 each defines a respective plane. For the system 500, the respective planes defined by the sensor structures 515, 516, 517 are arranged in a coplanar fashion, where the sensors 510, 511, 512 are arranged along a line and have substantially the same angular orientation with respect to each other.

The system 500 further includes a magnet 520 with a north pole and a south pole that define an axis of the magnet 520. The magnet 520, in similar fashion to the magnet 420 of FIG. 4, travels along a path of travel 525, where the path of travel 525 is substantially linear. Also in similar fashion to the system 400, the path of travel 525 of the system 500 is substantially parallel to the respective planes defined by the sensor structures 515, 516, 517. For the system 500, the path of travel is also substantially parallel to the line along which the sensors 510, 511 and 512 are arranged, and is a first distance 'W' from that line in first Cartesian coordinate axis and a second distance 'H' from that line (or from the first Cartesian coordinate axis) in a second Cartesian coordinate axis.

As with the plane of the sensor structure 415, the planes defined by the sensor structures 515, 516, 517 are oriented out-of-plane with the axis of the magnet 420. As shown in FIG. 5, the planes defined by the sensor structures are oriented substantially perpendicular to the axis of the magnet 520. It will be appreciated that, as with the system 400, other out-of-plane arrangements are possible. For example, the planes defined by the sensor structures 515, 516, 517 could be oriented at an angle of 45 degrees, 50 degrees, or using any other appropriate orientation for a given embodiment. It will be appreciated that as the ratio of W to H increases, sensitivity for position sensing (e.g., ΔV/Δd) decreases, and as the W/H ratio decreases, sensitivity increases.

For the system 500, at least one of the sensors 510, 511, 512 operates in magnetic saturation (saturation mode) when the magnet 520 is located along a particular portion of the path of travel 525 (e.g., "in range"). Of course, more than one sensor may operate in saturation at the same time in such an arrangement. When operating in the saturation mode, the magnetoresistive sensors 510, 511, 512 each produce an electrical signal that corresponds with a linear position of the magnet 520 along the particular portion of the travel path 525. An example of such signals is illustrated in FIG. 6.

Figure 6:
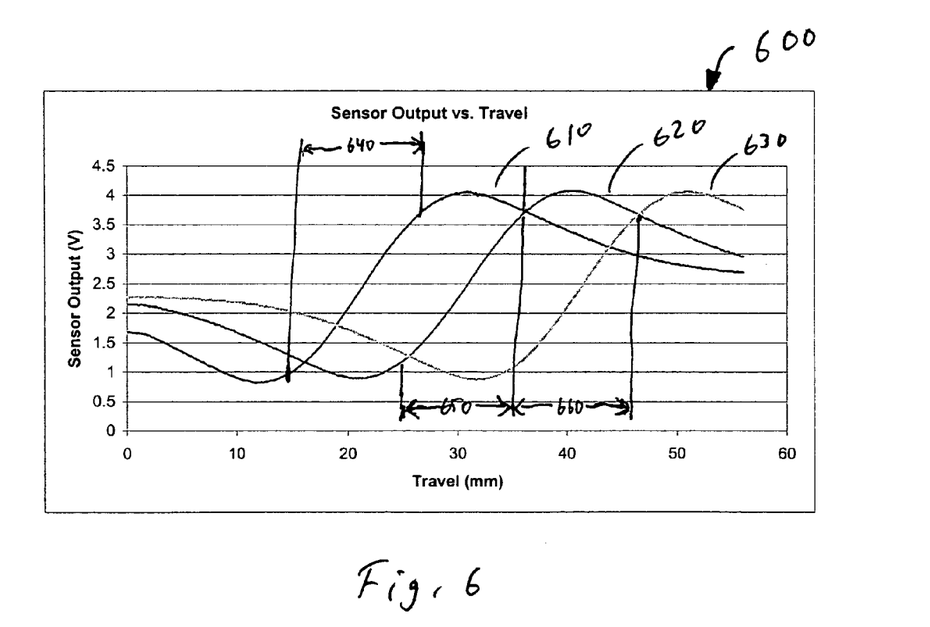
FIG. 6 is a graph illustrating electrical signals produced by each of the sensors illustrated in FIG. 5.

FIG. 6 is a graph 600 that illustrates electrical signals 610, 620, 630 that are produced, respectively, by the sensors 510, 511, 512 of the system 500 shown in FIG. 5 as the magnet 520 travels from left to right along the travel path 525 (e.g., through the portion of the travel path 525 where the sensors operate in saturation mode). As is shown in FIG. 6, the signals 610, 620, 630 include only a single mid-point crossing (where the mid-point is approximately 2.5 V). Because there is only a single mid-point crossing per signal, nearly the entire respective linear ranges 640, 650, 660 may be used for the purpose of linear position determination, as compared to only 50% of the linear range 330 being usable for the signal 310 shown in FIG. 3 due to its three mid-point crossings. For the particular situation illustrated in FIG. 6, the system 500 allows for a sensor to sensor spacing distance of approximately 10 mm as compared to a sensor to sensor spacing distance of approximately 5 mm for prior approaches. Thus, such an arrangement (as shown in FIG. 5) allows for approximately a 50% reduction in the number of sensors used in such systems, as is desirable for a given resolution.

The electrical signals 610, 620, 630 may be communicated to signal conditioning circuitry to determine the position of the magnet 520 along the path of travel. Using the signals 610, 620, 630 would allow for determining position along approximately a 30 mm section of the path of travel 525 (e.g., from approximately 15 mm to approximately 45 mm in the graph 600).

IV. Signal Conditioning Circuitry

Figure 7:
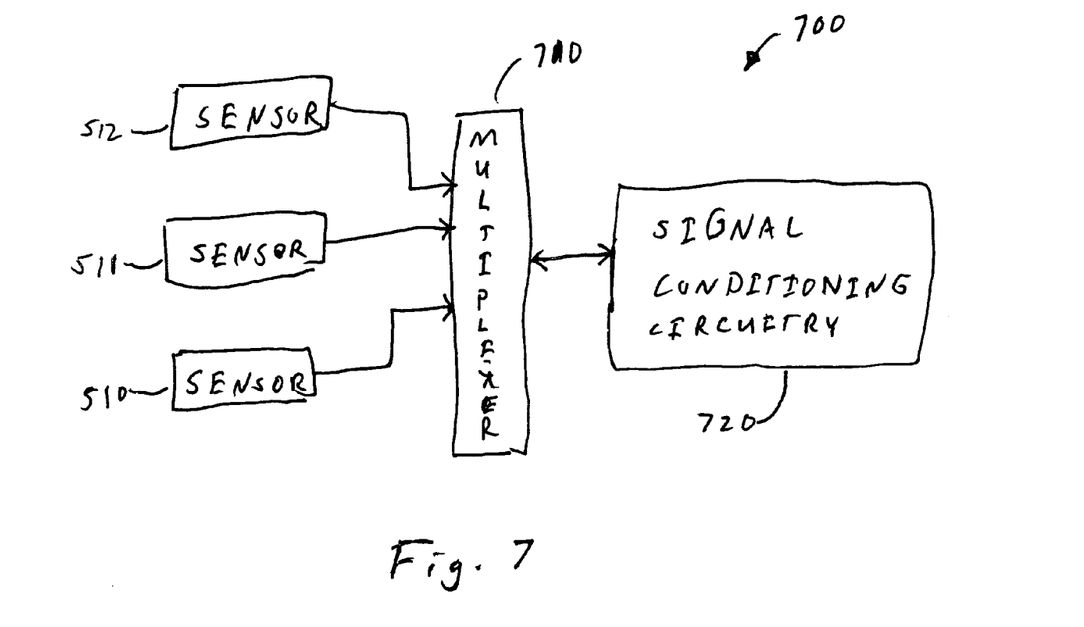
FIG. 7 is a block diagram illustrating the sensors of the linear positioning system of FIG. 5 along with a multiplexor and signal conditioning circuitry.

FIG. 7, illustrates the sensors 510, 511, 512 coupled with a multiplexer 710. The multiplexer 710 is further coupled with signal conditioning circuitry 720. As was discussed above, the signal conditioning circuitry 720 may be implemented in any number of fashions, such as those described in AN211 cited above. For example, the signal conditioning circuitry 720 may be include a signal amplifier and a microcontroller for analyzing the electrical signals 610, 620, 630 that are produced by the sensors 510, 520, 530. The microcontroller may include service logic that, when executed, controls the multiplexer so as to select one of the signals 610, 620, 630. The microcontroller may then perform an analog to digital conversion on the selected signal and determine the position of the magnet 520 along the path of travel 525 by comparing the digital value resulting from the conversion with a predetermined look-up table for the system 500 that has been included in the microcontroller. Alternatively a line fit may be used. Of course, any number of approaches may be used to determine the position of the magnet 520 along the path of travel 525 and the foregoing is provided only by way of example, not limitation.

V. Calibration and Method for Determining Position

Depending on the desired accuracy for determining linear position, signal-conditioning techniques, such as using signal conditioning circuitry as discussed above, may be used to condition the sensors' non-linear response over temperature. The following is an example of the process of calibrating a sensor array and then using that calibration information to determine linear position. Such an approach may be applied, for example, to the linear positioning system illustrated in FIG. 5. For the below example, as is in FIG. 5, three sensors are used to determine linear position. The sensors are first calibrated, and then, using the calibration data for signal conditioning, linear position is determined using the sensors' output signals. In this example, the sensors of the array are held in fixed positions and the magnet moves along a path of travel in proximity to the fixed sensors.

Calibration

In this particular example, calibration of the three sensor array is performed in five steps. Each of these five steps is described below.

First, the magnet is moved past the sensor array. As the magnet passes the sensor array, respective minimum output voltage values and maximum output voltage values for each sensor of the three sensors are determined. In this disclosure, the terms minimum and maximum are used to describe measured and/or calculated values. The actual minimum and maximum values depend on the particular embodiment and may vary depending on a number of factors.

After calculating a difference between the respective maximum and minimum voltage values, 90% of each sensor's output signal is determined. The positioning system, for this example, is then setup (e.g., each sensors position is adjusted) so that magnet travel begins at the beginning of the first sensor's usable output range (e.g., corresponding to approximately 5% above the minimum output voltage of the first sensor. In this example, the 5% value was determined assuming that 90% of the output range is usable signal (e.g., from 5% to 95%). For the remainder of the discussion of this example, this 90% region will simply be referred to as the "usable region" or "usable sensor response." Additionally, the second sensor may be setup (positioned) such that magnet travel begins at the beginning of its usable output range and at the end of the first sensors usable range (e.g., 95% of the usable signal). Likewise, the third sensor may be setup in a similar fashion with respect to the second sensor.

The second step in calibrating the three sensor system includes passing the magnet by the sensors of the array (e.g., after the "setup" of the first step) while recording both magnet position and all three corresponding sensors' responses. For each sensor, a respective output voltage of the sensor is fit as a third order response relative to magnet position. This yields three third order equations for position as a function of voltage, one for each sensor. These equations are given below.

$$s_1X = s_1a_3 * s_1V^3 + s_1a_2 * s_1V^2 + s_1a_1 * s_1V + s_1a_0$$

$$s_2X = s_2a_3 * s_2V^3 + s_2a_2 * s_2V^2 + s_2a_1 * s_2V + s_2a_0$$

$$s_3X = s_3a_3 * s_3V^3 + s_3a_2 * s_3V^2 + s_3a_1 * s_3V + s_3a_0$$

In the above equations $s_nX$ references a linear position 'X' of sensor 'n', where n corresponds to sensor 1, 2 or 3; $s_na_m$ are third order polynomial coefficients 'm' of sensor n, where m=1, 2 or 3; and $s_nV$ is a voltage 'V' of sensor n at position 'X' and temperature 'T'.

For this particular example, the third calibration step includes repeating the second step at multiple temperatures. For the present example, five temperatures between −55° C. and 225° C. were used. From the information gathered at these various temperatures, third order equations for each sensor at each temperature may be determined. From the equations determined from the information gathered at the five different temperatures, the coefficients for each sensor can be fit to a second order curve versus temperature. Because the third order fits each have four coefficients, twelve equations are used to determine the second order fit over temperature (four per third order fit, multiplied by the three sensors).

These equations are generally in the form of:

$$s_na_m = b_2 * T^2 + b_1 * T + b_0$$

The specific twelve equations for the three sensors, in groups of four for each of the three sensors, are:

For Sensor 1:

$$s_1a_3 = s_1b_2a_3 * T^2 + s_1b_1a_3 * T + s_1b_0a_3$$

$$s_1a_2 = s_1b_2a_2 * T^2 + s_1b_1a_2 * T + s_1b_0a_2$$

$$s_1a_1 = s_1b_2a_1 * T^2 + s_1b_1a_1 * T + s_1b_0a_1$$

$$s_1a_0 = s_1b_2a_0 * T^2 + s_1b_1a_0 * T + s_1b_0a_0$$

For Sensor 2:

$$s_2a_3 = s_2b_2a_3 * T^2 + s_2b_1a_3 * T + s_2b_0a_3$$

$$s_2a_2 = s_2b_2a_2 * T^2 + s_2b_1a_2 * T + s_2b_0a_2$$

$$s_2a_1 = s_2b_2a_1 * T^2 + s_2b_1a_1 * T + s_2b_0a_1$$

$$s_2a_0 = s_2b_2a_0 * T^2 + s_2b_1a_0 * T + s_2b_0a_0$$

For Sensor 3:

$$s_3a_3 = s_3b_2a_3 * T^2 + s_3b_1a_3 * T + s_3b_0a_3$$

$$s_3a_2 = s_3b_2a_2 * T^2 + s_3b_1a_2 * T + s_3b_0a_2$$

$$s_3a_1 = s_3b_2a_1 * T^2 + s_3b_1a_1 * T + s_3b_0a_1$$

$$s_3a_0 = s_3b_2a_0 * T^2 + s_3b_1a_0 * T + s_3b_0a_0$$

The fourth step of the calibration process for this example includes curve-fitting the output voltage data relative to position that was gathered in step two as a first order function of position. The coefficients from this first order fit are then fit to a first order approximation over temperature. This is essentially the reverse of the fitting performed in steps two and three as described above, where position was curve-fit as a function of voltage. These new equations will be used to determine which sensor to use to give a valid position reading. These curve fits give three additional equations, each with two coefficients, and the coefficients from these three equations each yield two temperature dependent equations. The equations for voltage as a first order function of position are shown below as:

$$s_1V = s_1c_1 * X + s_1c_0$$

$$s_2V = s_2c_1 * X + s_2c_0$$

$$s_3V = s_3c_1 * X + s_3c_0$$

In these equations, $s_nV$ is output voltage, V, of sensor n; $s_nc_p$ is a first order polynomial coefficient, 'p', of sensor n; and X is linear position.

The equations of the above coefficients, c, as a function of temperature are:

For Sensor 1:

$$s_1c_1 = s_1d_1c_1 * T + s_1d_0c_1$$

$$s_1c_0 = s_1d_1c_0 * T + s_1d_0c_0$$

For Sensor 2:

$$s_2c_1 = s_2d_1c_1 * T + s_2d_0c_1$$

$$s_2c_0 = s_2d_1c_0 * T + s_2d_0c_0$$

For Sensor 3:

$$s_3c_1 = s_3d_1c_1 * T + s_3d_0c_1$$

$$s_3c_0 = s_3d_1c_0 * T + s_3d_0c_0$$

The fifth step in the calibration process for this example is to apply the coefficients determined in steps one to four to signal conditioning circuitry, such as the signal conditioning circuitry shown in FIG. 7. For instance, the coefficients and equations determined above may be programmed into a microprocessor or microcontroller included in the signal conditioning circuitry 720. This may be done in a number of fashions. For example, the data may be programmed in the form of lookup tables, equations, or a combination of both. Of course, other techniques are also possible. The final coefficients are shown below.

For Sensor 1:

$$s_1b_2a_3 \; s_1b_1a_3 \; s_1b_0a_3$$

$$s_1b_2a_2 \; s_1b_1a_2 \; s_1b_0a_2$$

$$s_1b_2a_1 \; s_1b_1a_1 \; s_1b_0a_1$$

$$s_1b_2a_0 \; s_1b_1a_0 \; s_1b_0a_0$$

and:

$$s_1d_1c_1 \; s_1d_0c_1$$

$$s_1d_1c_0 \; s_1d_0c_0$$

For Sensor 2:

$$s_2b_2a_3 \; s_2b_1a_3 \; s_2b_0a_3$$

$$s_2b_2a_2 \; s_2b_1a_2 \; s_2b_0a_2$$

$$s_2b_2a_1 \; s_2b_1a_1 \; s_2b_0a_1$$

$$s_2b_2a_0 \; s_2b_1a_0 \; s_2b_0a_0$$

and:

$$s_2d_1c_1 \; s_2d_0c_1$$

$$s_2d_1c_0 \; s_2d_0c_0$$

For Sensor 3:

$$s_3b_2a_3 \; s_3b_1a_3 \; s_3b_0a_3$$

$$s_3b_2a_2 \; s_3b_1a_2 \; s_3b_0a_2$$

$$s_3b_2a_1 \; s_3b_1a_1 \; s_3b_0a_1$$

$$s_3b_2a_0 \; s_3b_1a_0 \; s_3b_0a_0$$

and:

$$s_3d_1c_1 \; s_3d_0c_1$$

$$s_3d_1c_0 \; s_3d_0c_0$$

Determining Position Using Calibrated Sensors

After the system has been calibrated, such as by using the approach described above, the linear positioning system may now be used to accurately determine linear position based on voltage readings from the sensors. Briefly, for one embodiment, signal conditioning circuitry (e.g., a microprocessor or microcontroller) may be used to determine the operating temperature of the linear positioning system, select an appropriate sensor to use for determining position, and then calculate position. This process is outlined below in four steps.

As a first step, the operating temperature of the linear positioning system is measured. This temperature measurement can be made using any number of thermal devices, such as a thermal diode, for example. Such techniques are known and are not described in detail here.

As a second step, given the usable sensor's range determined in the calibration process, the expected minimum, median, and maximum voltages at the measured temperature are calculated. This takes into account the respective positions that correspond with the maximum and minimum voltages for a given sensor's usable signal range. In making these determinations, the calibration data from step four of the above described calibration process is used. The respective equations for each sensor are shown below.

For Sensor 1:

$$s_1c_1 = s_1d_1c_1 * T + s_1d_0c_1$$

$$s_1c_0 = s_1d_1c_0 * T + s_1d_0c_0$$

For Sensor 2:

$$s_2c_1 = s_2d_1c_1 * T + s_2d_0c_1$$

$$s_2c_0 = s_2d_1c_0 * T + s_2d_0c_0$$

For Sensor 3:

$$s_3c_1 = s_3d_1c_1 * T + s_3d_0c_1$$

$$s_3c_0 = s_3d_1c_0 * T + s_3d_0c_0$$

In the above equations, 'T' is the temperature measured in the first position determination step described above.

The above equations are then used to determine the minimum, median and maximum voltages for each sensor for a given sensor's usable signal range at the measured temperature.

The equations for making these determinations are as follows:

For Sensor 1:

$$s_1V_{1min} = s_1c_1 * X_{1min} + s_1c_0$$

$$s_1V_{1max} = s_1c_1 * X_{1max} + s_1c_0$$

$$s_1V_{1med} = (s_1V_{1max} - s_1V_{1min})/2 + s_1V_{1min}$$

For Sensor 2:

$$s_2V_{2min} = s_2c_1 * X_{2min} + s_2c_0$$

$$s_2V_{2max} = s_2c_1 * X_{2max} + s_2c_0$$

$$s_2V_{2med} = (s_2V_{2max} - s_2V_{2min})/2 + s_2V_{2min}$$

For Sensor 3:

$$s_3V_{3min} = s_3c_1 * X_{3min} + s_3c_0$$

$$s_3V_{3max} = s_3c_1 * X_{3max} + s_3c_0$$

$$s_3V_{3med} = (s_3V_{3max} - s_3V_{3min})/2 + s_3V_{3min}$$

In the above equations, $s_nV_n\text{min}$ is the minimum voltage seen by sensor n for a given usable range, $s_nV_n\text{med}$ is the median voltage seen by sensor n for a given usable range, and $s_nV_n\text{max}$ is the maximum voltage seen by sensor n for a given usable range. Further, $X_n\text{min}$ is the minimum voltage seen by sensor n for a given usable range, $X_n$med is the median voltage seen by sensor n for a given usable range, and $X_n$max is the maximum voltage seen by sensor n for a given usable range.

As the third step of position determination, each sensor's output signal is measured. These signals are referenced as $s_nV$, where V is voltage and n=1, 2 or 3, corresponding to sensors 1, 2, and 3, respectively. These signals are compared with a matrix of conditions to determine which sensor's output response to use for determining position. Such a matrix is illustrated in the Table 1 below.

TABLE 1

|  | Sensor 1 | Sensor 2 | Sensor 3 |
|---|---|---|---|
| <Range | $s_1V < s_1V_{1min}$ | — | — |
| Use Sensor 1 | $s_1V > s_1V_{1min}$ & $<s_1V_{1med}$ | $s_2V < s_2V_{2med}$ | — |
| Use Sensor 2 | $s_1V > s_1V_{1max}$ | $s_2V_{2min} <= s_2V < s_2V_{2med}$ | $s_3V < s_3V_{3med}$ |
| Use Sensor 2 | — | $s_2V_{2med} < s_2V < s_2V_{2med}$ | $s_3V <= s_3V_{3min}$ |
| Use Sensor 3 | — | $s_2V > s_2V_{2med}$ | $s_1V > s_3V_{3med}$ & $<s_3V_{3max}$ |
| >Range | — | — | $s_3V > s_3V_{3max}$ |

In Table 1, $s_nV_{n\ min}$, $s_nV_{n\ med}$, and $s_nV_{n\ max}$ correspond to the minimum, median, and maximum voltage of a given sensor, n, for the particular sensor's usable signal range at a given temperature. These are the values which were calculated in step two of this particular position determination process. The left column of Table 1 indicates which sensor's signal should be used to determine position. This selection is based on the conditions listed in columns 2, 3, and 4. Furthermore, in a situation where none of the conditions in columns 2, 3 and 4 are satisfied, the magnet is likely beyond the expected range of travel (e.g., outside the particular portion of the path of travel where at least one of the sensors is magnetically saturated).

As the fourth step of this position determination process, the output signal of the sensor selected in step three is used to determine linear position. This step uses the calibration data and coefficients collected in steps two and three of the calibration process described above. Position is calculated as a second order function of temperature and a third order response across the selected sensor's usable output voltage swing.

For example, if the three sensors' output signals satisfy the conditions in Table 1 for sensor one to be used for determining position, the following equations are then used to determine position.

$$s_1a_3 = s_1b_2a_3*T^2 + s_1b_1a_3*T + s_1b_0a_3$$

$$s_1a_2 = s_1b_2a_2*T^2 + s_1b_1a_2*T + s_1b_0a_2$$

$$s_1a_1 = s_1b_2a_1*T^2 + s_1b_1a_1*T + s_1b_0a_1$$

$$s_1a_0 = s_1b_2a_0*T^2 + s_1b_1a_0*T + s_1b_0a_0$$

The above four equations are then used in the equation below, where X is position.

$$X = s_1a_3*s_1V^3 + s_1a_2*s_1V^2 + s_1a_1*s_1V + s_1a_0$$

It will be appreciated that the determination of position may be accomplished in like fashion when the output of the three sensors meets the conditions in Table 1 for using the second or third sensor for determining position. For the purpose of brevity, the specific equations for these situations are not shown here.

Accuracy

Depending on the accuracy desired for position determination and the particular operating temperature range of interest, several alternatives for calibration are possible (e.g., using the calibration approach described above or any appropriate alternative approach). For instance, signal response of the sensors may be approximated as a linear, first order line, as opposed to the third order fit in the above example. Additionally, the dependence of the sensors' output signals on temperature may be ignored or may be determined as a first or second order temperature calibration using standard coefficients for such systems that are determined based on the characterization of a given number of like systems.

CONCLUSION

While a number of aspects and embodiments have been discussed above, it will be appreciated that various modifications, permutations, additions and/or sub-combinations of these aspects and embodiments are possible. It is therefore intended that the following appended claims and claims hereafter introduced are interpreted to include all such modifications, permutations, additions and/or sub-combinations as are within their true spirit and scope.

What is claimed is:

1. A system for determining linear position, the system comprising:
    a magnet having a first magnetic pole and a second magnetic pole, wherein the first magnetic pole and the second magnetic pole define an axis of the magnet; and
    a magnetoresistive sensor comprising a magnetoresistive sensor structure that includes a Wheatstone bridge circuit including a plurality of anisotropic magnetoresistors, the magnetoresistive sensor structure defining a plane that, in the system, is oriented out-of-plane with the axis of the magnet,
    wherein, in operation, the magnet travels, with respect to the magnetoresistive sensor, along a substantially linear path of travel that is substantially parallel to the plane defined by the sensor structure, such that the sensor operates in a saturation mode when the magnet is located along a given portion of the path of travel and, when operating in the saturation mode, the magnetoresistive sensor produces an electrical signal that corresponds with a linear position of the magnet along the given portion of the path of travel, the electrical signal approximates a third order polynomial and includes only a single mid-point crossing as the magnet travels along the given portion of the path of travel in a single direction.

2. The system of claim 1, wherein the plane defined by the sensor structure is substantially perpendicular to the axis of the magnet.

3. The system of claim 1, wherein the path of travel is arranged along a line that is a first distance from an approximate center of the magnetoresistive sensor structure in a first Cartesian coordinate axis and a second distance from the first Cartesian coordinate axis in a second Cartesian coordinate axis.

4. The system of claim 3, wherein the first distance is measured in the plane defined by the magnetoresistive sensor structure and the second distance is measured along a line that is orthogonal to the plane defined by the magnetoresistive sensor structure.

5. The system of claim 1, wherein the plurality of magnetoresistors comprise ferrous materials.

6. The system of claim 1, wherein the Wheatstone bridge circuit comprises four magnetoresistors arranged in a diamond-shaped pattern, wherein each side of the diamond-shaped pattern includes a single one of the four resistors.

7. The system of claim 1, further comprising signal conditioning circuitry for receiving the electrical signal from the magnetoresistive sensor and converting the electrical signal to a linear position of the magnet along the given portion of the path of travel.

8. A system for determining linear position, the system comprising:
- a magnet having a first magnetic pole and a second magnetic pole, wherein the first magnetic pole and the second magnetic pole define an axis of the magnet; and
- a plurality of magnetoresistive sensors, each of the plurality of magnetoresistive sensors including a magnetoresistive sensor structure that includes a Wheatstone bridge circuit including a plurality of anisotropic magnetoresistors, each magnetoresistive sensor structure defining a respective plane, the defined planes of the magnetoresistive sensor structures being oriented out-of-plane with the axis of the magnet in a substantially coplanar fashion with one another, the plurality of magnetoresistive sensors being arranged along a first line and having substantially the same angular orientation with respect to one another,
- wherein, in operation:
  - the magnet travels, with respect to the magnetoresistive sensors, along a substantially linear path of travel that is substantially parallel to (i) the respective planes defined by the sensor structures and (ii) the first line;
  - at least one of the magnetoresistive sensors of the plurality operates in a saturation mode when the magnet is located along a particular portion of the path of travel; and
  - when operating in the saturation mode, the magnetoresistive sensors each produce an electrical signal that corresponds with a linear position of the magnet along the particular portion of the travel path, each electrical signal approximating a third order polynomial and having only a single mid-point crossing as the magnet travels, in a single direction, along the particular portion of the path of travel corresponding with each respective electrical signal.

9. The system of claim 8, wherein the planes defined by the sensor structures are substantially perpendicular to the axis of the magnet.

10. The system of claim 8, wherein the path of travel is arranged along a second line, the second line being a first distance from the first line in a first Cartesian coordinate axis and a second distance from the first line in a second Cartesian coordinate axis.

11. The system of claim 8, further comprising signal conditioning circuitry for receiving the respective electrical signals from the plurality of magnetoresistive sensors and determining a linear position of the magnet along the particular portion of the path of travel based on the electrical signals.

12. A method for detecting linear position comprising:
- providing a magnet having a first magnetic pole and a second magnetic pole, wherein the first magnetic pole and the second magnetic pole define an axis of the magnet;
- providing a magnetoresistive sensor comprising a magnetoresistive sensor structure that includes a Wheatstone bridge circuit including a plurality of anisotropic magnetoresistors, the magnetoresistive sensor structure defining a plane that is oriented out-of-plane with the axis of the magnet; and
- receiving an electrical signal produced by the magnetoresistive sensor, the electrical signal corresponding with a linear position of the magnet along a given portion of a path of travel, the path of travel being substantially parallel with the plane, wherein the magnetoresistive sensor operates in a saturation mode when the magnet is located along the given portion of the path of travel and wherein the electrical signal produced by the magnetoresistive sensor approximates a third order polynomial and includes only a single mid-point crossing as the magnet travels along the given portion of the path of travel in a single direction.

13. The method of claim 12, wherein the plane defined by the sensor structure is substantially perpendicular to the axis of the magnet.

14. The method of claim 12, wherein the electrical signal produced by the magnetoresistive sensor comprises an analog signal and the method further comprises:
- amplifying the analog signal;
- converting the analog signal to a digital value; and
- determining the linear position of the magnet along the given portion of the path of travel based on the digital value.

* * * * *